United States Patent [19]
Bricheno et al.

[11] Patent Number: 4,950,045
[45] Date of Patent: Aug. 21, 1990

[54] SINGLE MODE COUPLERS

[75] Inventors: Terry Bricheno, Great Sampford; Alan Fielding, Sawbridgeworth; Stephen Day, Harlow, all of Great Britain

[73] Assignee: STC PLC, London, England

[21] Appl. No.: 377,468

[22] Filed: Jul. 10, 1989

[30] Foreign Application Priority Data

Jul. 15, 1988 [GB] United Kingdom ............... 8816896

[51] Int. Cl.$^5$ ............................................. G02B 6/28
[52] U.S. Cl. ................................. 350/96.16; 350/96.17
[58] Field of Search .............. 350/96.15, 96.16, 96.18, 350/96.17

[56] References Cited

U.S. PATENT DOCUMENTS

| 4,213,670 | 7/1980 | Milton et al. | 350/96.16 |
| 4,449,783 | 5/1984 | Witte | 350/96.16 |
| 4,474,425 | 10/1984 | Kaede | 350/96.16 |
| 4,484,794 | 11/1984 | Witte | 350/96.16 |
| 4,590,619 | 5/1986 | Winzer | 350/96.16 X |
| 4,591,372 | 5/1986 | Bricheno et al. | 350/96.15 X |

FOREIGN PATENT DOCUMENTS

| 56-88102 | 7/1981 | Japan | 350/96.16 |
| 60-186810 | 9/1985 | Japan | 350/96.16 |
| 61-25110 | 2/1986 | Japan | 350/96.16 |
| 62-08109 | 1/1987 | Japan | 350/96.16 |
| 63-83706 | 4/1988 | Japan | 350/96.16 |

Primary Examiner—John D. Lee
Attorney, Agent, or Firm—Lee, Mann, Smith, McWilliams & Sweeney

[57] ABSTRACT

A 1×N single mode optical waveguide coupler comprises a single input optical fibre (1), a slab-like mixer waveguide (3) and a plurality (N) of output optical fibres (2). As a result of interference effects light introduced into the mixer waveguide (3) via the centrally located input fibre (1) produces a linear array of output spots at various intervals along the length of the mixer waveguide. The length of the mixer waveguide is chosen such that the output optical fibres are aligned with one such array of output spots. The fibres may be adiabatically tapered to a smaller diameter in order to increase their modal spot size.

10 Claims, 1 Drawing Sheet

SINGLE MODE COUPLERS

FIELD OF THE INVENTION

This invention relates to single mode couplers and in particular to a 1×N single mode optical waveguide coupler, especially an optical fibre coupler, that is a single input-multiple output coupler.

BACKGROUND OF THE INVENTION

In our GB published Application (Ser. No. 2,207,525) corresponding to U.S. application Ser. No. 214,603, filed 1st Jul. 1988 (Bricheno et al.) (now abandoned) there is described an N×N star coupler fabricated using an annular coherent mixer guide. Whereas this star coupler generally has N inputs and N outputs, it may be used simply as 1×N star coupler. An 8×8 star coupler according to the aforementioned application may be manufactured by taking eight 125 $\mu$m OD single mode fibres which have been progressively stretched using the adiabatic technique described in GB 2,150,703 B (U.S. Pat. No. 4,591,372) to produce parallel-sided reduced diameter regions of 50 $\mu$m OD, this increases the mode spot diameter from 10 $\mu$m to about 25 $\mu$m. These reduced diameter regions of the fibres are clamped around a silica former whose diameter is such that the fibres form a closed packed layer thereon. The resulting sub-assembly is then glued together, sawn in half and the sawn edges polished. The polished end of one half is butted up against one end, the input end, of an annular mixer guide of appropriate dimensions and the other half butted up against its other end in the appropriate orientation. Index matching adhesive is employed to joint the three parts and the resulting assembly may be potted. Injection of a Gaussian spot of light into the annular mixer guide by one of the fibres results in spreading out of the light as it travels down the guide. Initially the power will spread all round the annulus but after a certain distance it begins to overlap back on itself. Since the initial and overlapping light originates from the same source it is coherent and an interference pattern is created. After a certain distance into the annular mixer guide a high contrast regular pattern of output spots appears every few millimeters, the number of output spots gradually decreasing. For the 8×8 coupler referred to above and 1.3 $\mu$m wavelength light, an annular mixer guide with an OD of 180 $\mu$m, a wall thickness of 50 $\mu$m and length of 23 mm is required. With a length of 23 mm eight output spots are obtained. The output fibres are aligned with these output spots. An annular coherent mixer guide was used since it gave all input and output fibres an equivalent position and, by fabricating the annulus sufficiently narrow, it will confine the beam in a single mode in one of the input planes. Since the operation of the coupler is interference based, the coupler is inherently wavelength sensitive.

The present invention aims to produce a 1×N coupler structure which is such that, in particular, its fabrication can be facilitated in comparison with that required for the N×N couplers with annular mixer guides referred to above.

SUMMARY OF THE INVENTION

According to the present invention there is provided a single mode optical waveguide coupler having a single input which comprises a single mode optical waveguide optically coupled with one end of a elongate generally slab-like mixer waveguide, and a set of single mode output optical waveguides optically coupled to the other end of the mixer waveguide, wherein the dimensions of the mixer waveguide are such that interference effects therein for light launched into the single input produce a set of output spots in an array at said other end, each member of the set of output waveguides being positioned such as to be aligned with a respective member of the set of spots.

BRIEF DESCRIPTION OF THE DRAWINGS

Embodiments of the invention will now be described with reference to the accompanying drawings, in which.

DESCRIPTION OF THE PREFERRED EMBODIMENTS

Figure 1:
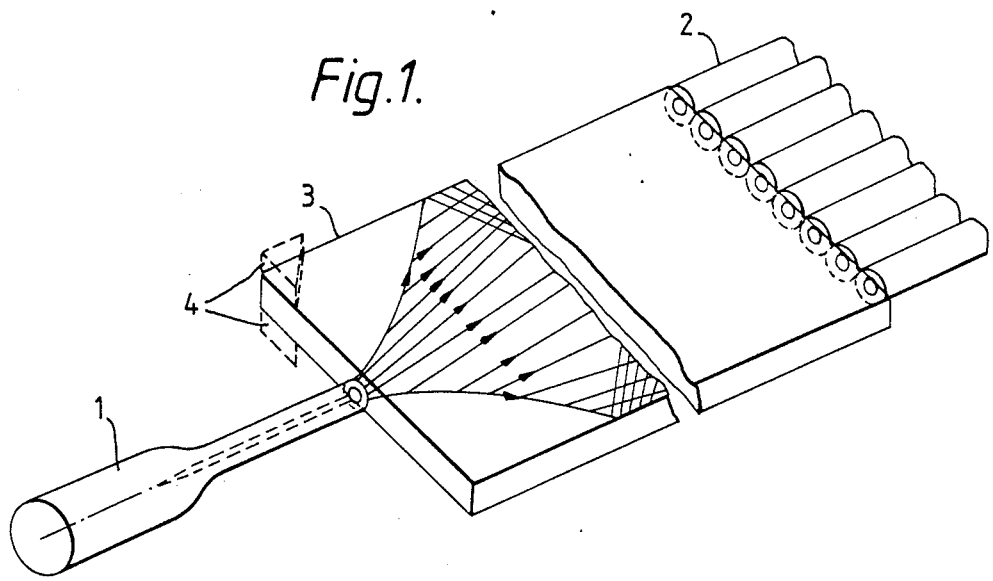
FIG. 1 is a schematic perspective view of a 1×8 single mode fibre coupler.

The 1×8 single mode fibre coupler illustrated in FIG. 1 comprises an input single mode fibre 1, which is indicated as having a tapered end to expand the beam and ease alignment and typically is formed from a 125 $\mu$m OD fibre which was stretched using the technique described in GB 2,150,703 B (U.S. Pat. No. 4,591,372) to produce a reduced diameter parallel-sided region of 50 $\mu$m OD. Such a stretched fibre may be cleaved at the reduced diameter region to produce two fibres with tapered ends. The eight output single mode fibres 2 similarly may have reduced diameter ends manufactured by the stretching technique. The fibres 1 and 2 are butted against opposite ends of a generally slab-like mixer waveguide 3, which as illustrated has a rectangular cross-section and is substantially longer than it is wide as will be apparent from the following. The fibres 1 and 2 may be secured to the slab mixer guide with an index matching adhesive and the whole assembly may be potted up in an enclosure (not shown) using a silicone resin. The end of fibre 1 is arranged at a central location relative to its associated end of guide 3 and the ends of fibres 2 are close-packed in a line relative to their associated end of guide 3.

Light launched into slab mixer guide at a central location will spread out, be reflected at the walls and interfere coherently in a similar manner to that achieved with the annular mixer guide referred to above. In view of the coherent mixing a resultant regular spot pattern will also be produced at discrete lengths along the guide, and in the illustrated case the spots will be in a linear array or pattern. As with the annular guide, it is possible to produce different numbers of spots in dependence on the width and length of the slab-like guide.

Figure 2:
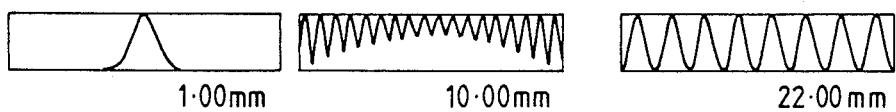
FIG. 2 shows three plots, for one width of slab mixer guide, of how the light intensity is predicted to vary within the slab mixer guide and along its length for a Gaussian spot launched centrally thereinto.
Figure 3:
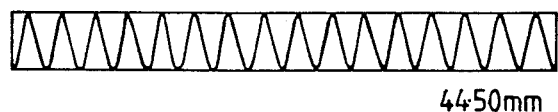
FIG. 3 shows a corresponding plot for another width of slab mixer guide.

FIG. 2 illustrates the computer predicted output pattern for a 400 $\mu$m wide slab, with single mode input fibre tapered and reduced in diameter to 50 $\mu$m, at 1.00 mm, 10.00 mm and 22.00 mm. At 22.00 mm there are eight spots of equal intensity and thus such a length is appropriate for a 1×8 coupler with single mode output fibre tapered and reduced in diameter to 50 $\mu$m. FIG. 3 illustrates the predicted output pattern for a 800 $\mu$m wide slab at 44.50 mm. This has sixteen spots of equal intensity, making it appropriate for a 1×16 coupler.

The same basic computer modelling technique as used for the annular mixer guide was employed, although an additional phase term had to be included to take into account reflections at the slab walls. This additional phase term does not contribute any polarisation sensitivity.

It should be noted that a slab mixer guide will not give equivalence if used in an N×N configuration. However, if only a single input centrally located is used, symmetry is maintained for a 1×N configuration.

Whilst the coupler with an annular mixer guide is capable of being used as a 1×N device, the slab mixer guide offers a simpler fibre array pattern.

Preferably the slab mixer guide comprises a rectangular cross-sectioned element provided with a protective cladding of a lower refractive index material. To achieve this the element may be simply sandwiched between two suitable slabs of glass 4, parts of which are indicated in FIG. 1 by dashed lines. The sides need not be clad. Alternatively it may be completely unclad. A clad slab mixer guide may be formed from a preform prepared by fusing together suitable slabs of glass in order to produce an "ideal" step index profile, using techniques employed to produce fibre tape and strip waveguides. The thickness of the slab is such as to match the mode spot diameter. For a fibre reduced in diameter to 50 $\mu$m and providing a mode spot diameter of 25 $\mu$m, a slab thickness of 30 $\mu$m will suffice. This may be clad to produce a mixer slab having an overall thickness of the order of one mm.

We claim:

1. A 1×N single mode optical waveguide coupler having a single input which comprises a single mode optical waveguide optically coupled to one end of an elongate generally slab-like waveguide, the single input being disposed centrally of the one end of the slab-like waveguide, and a set of N single mode output optical waveguides optically coupled to the other end of the slab-like waveguide, wherein the slab-like waveguide is rectangular in cross-section and the dimensions of the slab-like waveguide are such that interference effects therein for light launched into the single input produce a set of output spots in a linear array at said other end, each member of the set of output waveguides being positioned such as to be aligned with a respective member of the set of spots.

2. A coupler as claimed in claim 1 wherein the single input comprises a single mode optical fibre which has an adiabatic taper so that its end coupled to the slab-like waveguide is parallel sided and of reduced diameter in comparison with the remainder thereof.

3. A coupler as claimed in claim 2 wherein the slab-like waveguide is an unclad structure.

4. A coupler as claimed in claim 2 wherein the slab-like waveguide is at least partially clad with material of a lower refractive index.

5. A coupler as claimed in claim 2 wherein the output waveguides each comprise a respective single mode optical fibre which has an adiabatic taper so that its end coupled to the slab-like waveguide is parallel sided and of reduced diameter in comparison with the remainder thereof, wherein the reduced diameter is of the order of 50 $\mu$m, the slab-like waveguide is in the range of 400–800 $\mu$m wide, of the order of 30 $\mu$m thick and in the range 1–45 mm long.

6. A coupler as claimed in claim 1 wherein the output waveguides each comprise a respective single mode optical fibre which has an adiabatic taper so that its end coupled to the slab-like waveguide is parallel sided and of reduced diameter in comparison with the remainder thereof.

7. A coupler as claimed in claim 6 wherein the slab-like waveguide is an unclad structure.

8. A coupler as claimed in claim 6 wherein the slab-like waveguide is at least partially clad with material of a lower refractive index.

9. A coupler as claimed in claim 1 wherein the slab-like waveguide is an unclad structure.

10. A coupler as claimed in claim 1 wherein the slab-like waveguide is at least partially clad with material of a lower refractive index.

* * * * *